United States Patent [19]

Watt

[11] 4,017,710
[45] Apr. 12, 1977

[54] WELDING ASSEMBLY

[75] Inventor: Elbert D. Watt, East Alton, Ill.

[73] Assignee: ACF Industries, Incorporated, New York, N.Y.

[22] Filed: Dec. 6, 1974

[21] Appl. No.: 530,368

[52] U.S. Cl. .............................. 219/130
[51] Int. Cl.² .......................... B23K 9/12
[58] Field of Search ............... 219/130, 136

[56] References Cited

UNITED STATES PATENTS

| | | | |
|---|---|---|---|
| 2,817,749 | 12/1957 | Flood et al. | 219/130 |
| 2,839,666 | 6/1958 | Launder et al. | 219/130 |
| 3,007,033 | 10/1961 | Newman et al. | 219/130 X |
| 3,431,391 | 3/1969 | Ehrenstein et al. | 219/130 |
| 3,514,571 | 5/1970 | Oelschlager et al. | 219/130 X |
| 3,538,300 | 11/1970 | Bazhenov et al. | 219/130 |
| 3,936,657 | 2/1976 | Groth | 219/130 X |

*Primary Examiner*—J. V. Truhe
*Assistant Examiner*—N. D. Herkamp
*Attorney, Agent, or Firm*—Henry W. Cummings

[57] ABSTRACT

A welding assembly is provided wherein a nozzle body is pivoted about the weld head whereby the welding tip can be given fine adjustment by means of pivoting the nozzle body about the pivot point. A wire guide is provided which is quickly removable from the nozzle body for cleaning and/or replacing the wire guide. The welding tip, a tip adapter, and a tip nut may comprise a large mass of electrically conductive material. To obtain fine adjustment, the nozzle body, wire guide, welding tip, tip adapter and tip nut may be simultaneously pivoted about the weld head to move the welding tip relative to the work piece.

27 Claims, 8 Drawing Figures

FIG. 1.

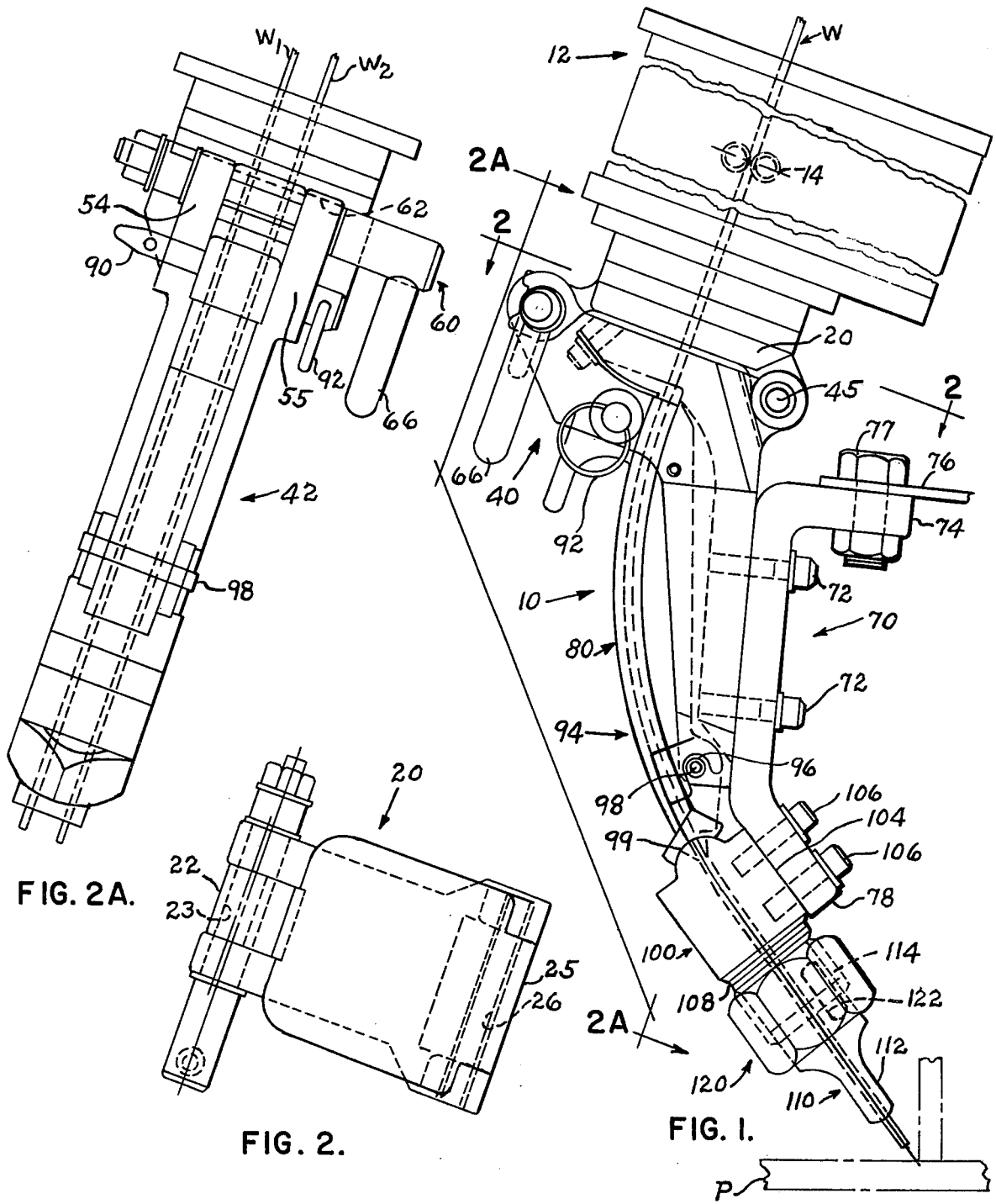

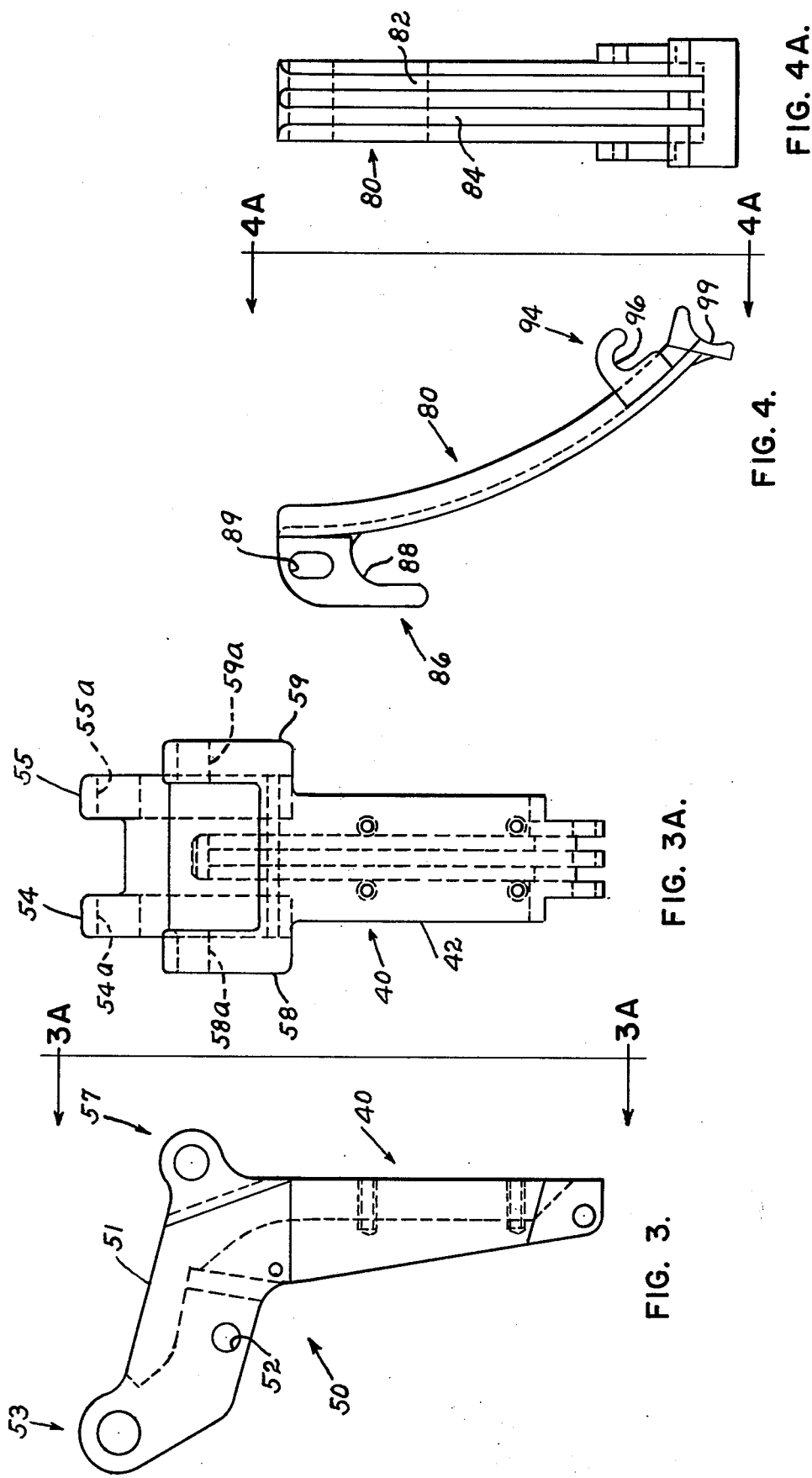

WELDING ASSEMBLY

BACKGROUND OF THE INVENTION

In the past with welding equipment, it has been difficult to obtain fine adjustments. It has been necessary to move the entire weld head, which was a somewhat difficult and awkward operation for the operator.

Furthermore, often the wire guide has become clogged with metal slivers, metal dust and other particulate material. This tends to clog the welding tip. In order to clean the wire guide it has been necessary to disassemble the entire welding assembly which is a time consuming operation, putting the weld equipment out of service during disassembly and reassembly.

Also, welding tips have a relatively short life, particularly under welding conditions wherein a large amount of current is required to carry out the welding operation. Replacement of welding tips can be a significant cost item in welding operations.

SUMMARY OF THE INVENTION

It therefore is an object of the present invention to provide a welding assembly in which fine adjustment of welding tip can be carried out without moving the entire welding head.

Another object of the present invention is to provide a welding assembly in which the wire guide is readily removable from the nozzle body for cleaning and replacement.

Another object of the present invention is to provide a welding assembly which improves welding tip life.

Another object of the present invention is to provide a welding assembly in which the welding tip can carry more current with less damage due to overheating.

A welding assembly is provided wherein a nozzle is pivoted about a weld head whereby the welding tip can be given fine adjustment by means of pivoting the nozzle body about the weld head. A wire guide is provided which is quickly removable from the nozzle body for cleaning and replacing the wire guide. The welding tip, tip adapter and a tip nut may comprise a large mass of electrically conductive material which conducts electric current more efficiently than without said large mass.

THE DRAWINGS

FIG. 1 is a side elevational view of the welding assembly of the present invention;

FIG. 2 is a view along the lines 2—2 in FIG. 1;

FIG. 2A is a view along the lines 2A—2A in FIG. 1;

FIG. 3 is a detail view of the nozzle body of the welding assembly of the present invention;

FIG. 3A is a view along the lines 3A—3A in FIG. 3;

FIG. 4 is a detail view of the removable wire guide of the present invention;

FIG. 4A is a view along the lines 4A—4A in FIG. 4;

FIG. 5 is a detail view of an eccentric pin which may be utilized in the welding assembly of the present invention;

DETAILED DESCRIPTION OF PREFERRED EMBODIMENTS

The welding assembly of the present invention is indicated in the drawings generally at 10. The assembly comprises a conventional welding head 12 having rollers therein 14 adapted to move one or more weld wires W downwardly toward a work piece P. A hinge plate 20 is integrally fixed to the weld head 12 and is preferably provided with a front extension 22 having an opening therein 23. The plate also has a rear extension 25 having an opening therein 26.

A nozzle body is indicated in the drawings generally at 40. The nozzle body comprises a generally vertical portion 42 and an adjustment portion indicated generally at 50 integral with portion 42. Adjustment portion 50 (FIGS. 3 and 3A) preferably comprises a generally horizontally inclined portion 51 having front and rear pin engagement portions 53 and 57. Rear pin engagement portion 57 may comprise extensions 58 and 59 having openings therein 58a and 59a. A pin 45 then is adapted to pass through the extension 25 in the hinge plate and the openings 58a and 59a in the nozzle body extensions to pivotally affix the nozzle body to the hinge plate at this point. Adjustment portion 50 further comprises spaced part extensions or arms 54 and 55 respectively, having openings therein 54a and 55a.

An eccentric pin indicated generally at 60 (FIG. 5) comprises a shaft portion 62 having an off center or offset portion 64. A cam handle 66 is provided integral with shaft 62 to rotate the same. Pin 60 passes through openings 54a and 55a and through hinge plate extension 22.

A bus bar indicated generally at 70 is preferably affixed to the rear face of nozzle body vertical portion 42 with appropriate fasteners 72. Bus bar 70 preferably has an extension 74 which may have an opening therein to facilitate engagement of the bus bar with a suitable electrical conductor 76 by means of suitable fastener(s) 77.

An important feature of the present invention is the removable wire guide indicated in the drawings generally at 80. This wire guide comprises one or more troughs for directing weld wire toward the work piece P. Two troughs are indicated in the drawings at 82 and 84 for movement of wires W, and W2 toward th work piece although only one trough or three or more troughs may be provided. The troughs may be of any desired cross section, such as circular, parabolic or elliptical cross section. Metal shavings and metal grindings often become logged in these troughs, resulting in movement of the weld wire at a reduced speed or even stopping weld wire movement altogether. In this event it is necessary to remove the wire guide and clean out these troughs. Previously, this involved shutting down the welder during disassembly and reassembly after cleaning.

In accordance with the present invention quick removal of the wire guide is obtained by providing a first latch means 86 adapted to engage the nozzle body. Latch means 86 preferably comprises a latch contour 88 adapted to engage the nozzle body, and includes an opening 89. A wire guide pin 90 is provided which passes through the opening 89 and through an opening 52 in nozzle body adjustment portion 51 whereby to maintain the wire guide in operative position during welding. Wire guide pin 90 is removable from latch means 86 and nozzle body opening 52 by means of a handle 92.

Wire guide 80 is also provided with a second latch means indicated generally at 94 comprising a latch contour 96, for example, hook-shaped, adapted to engage a transversely extending pin contour 98 in nozzle body portion 42.

Wire guide 80 further is provided with a saddle contour 99 adapted to engage a welding tip adapter indicated generally at 100. Adapter 100 is preferably made of material having high electrical conductivity, such as aluminum, aluminum alloys, copper or copper alloys. The adapter may have any suitable cross section, for example, square, rectangular or circular. An opening is provided therein for passage of one or more weld wires therethrough. Preferably bus bar 70 has an extension 78 which engages a face 104 of adapter 100 and is held in place with suitable fasteners 106.

A welding tip is indicated in the drawings generally at 110. The welding tip is also preferably made of highly electrically conductive material and is provided with a suitable opening therein for passage of one or more weld wires therethrough. The cross section of tip 110 may be of any suitable form, but it preferably decreases as indicated at 112 to facilitate placement of the welding tip adjacent the arc and/or work pieces to be welded.

As shown dotted in FIG. 1, tip 112 has an adapter engagement portion 114 preferably threaded which engages a threaded portion 108 of adapter 100.

A welding tip nut 120 which is internally threaded is inserted over tip 112 and is turned upon threaded portions 114 and 108 to achieve integral engagement of the welding tip with the adapter and the remainder of the welding assembly.

A dowel 122 may be provided in the tip 112 to control wire alignment in the use of a multi-wire welding assembly.

In the operation of the apparatus of the present invention, fine adjustment of welding tip 110 can be achieved by rotating pin 60 by means of handle 66. Clockwise movement of handle 66 moves welding tip clockwise and right to left in FIG. 1. Counterclockwise movement of handle 66 results in movement of welding tip 110 counterclockwise and left to right in FIG. 1.

Whenever there is an indication that one or more wires feeding troughs 82, 84 are becoming clogged, the wire guide 80 is readily removed by removing pin 90 from the wire guide and nozzle body by means of handle 92. The wire guide can easily be manually removed and cleaned. To replace the wire guide, it is merely necessary to engage latch means 96 with shaft contour 98 and pivot the wire guide into place, until the openings in the wire guide and the nozzle body align and then insert pin 90.

The combination of tip adapter 100, tip 110 and preferably though not essentially, the tip nut 120, if all are made of highly electrically conductive material, such as aluminum or aluminum alloys, copper or copper alloys, provides a large mass of electrically conductive material which conducts electric current more efficiently than without said large mass. Thus higher welding currents may be used, and the contact tips are less readily overheated than in prior welding arrangements. Thus there is less likelihood of burning out tip 110 and generally the useful life of welding tip 110 is increased by the welding assembly of the present invention.

Furthermore, if desired, the wire guide may be curved which tends to maintain electrical contact between the wire and the adapter and tip.

What is claimed is:

1. A welding assembly comprising:
   a weld head having means associated therewith for directing at least one weld wire generally in the direction of a work piece to be welded;
   a nozzle body including a wire guide pivotally mounted about said weld head;
   said nozzle body having means in association therewith for pivoting said nozzle body about said weld head;
   latch means removably mounting said wire guide upon said nozzle body;
   said wire guide having means thereon for further directing said weld wire toward said work piece;
   said nozzle body having means thereon adapted to engage electrical current carrying equipment;
   a welding tip mounted in operative relation with said wire guide to further direct movement of the weld wire toward said work piece;
   and means for maintaining said weld tip in engagement with said welding assembly;
   whereby said nozzle body, wire guide and welding tip may be simultaneously pivoted about said weld head to move said welding tip relative to said work piece, and whereby said wire guide can be readily removed from said welding assembly for cleaning and/or replacement thereof.

2. A welding assembly according to claim 1 wherein said means for pivoting said nozzle body about said weld head comprises an eccentric means.

3. A welding assembly according to claim 2 wherein said eccentric means comprises an eccentric pin which engages said nozzle body.

4. A welding assembly according to claim 1 wherein a welding tip adapter is provided in engagement with said welding tip and said wire guide.

5. A welding assembly according to claim 4 wherein said electrically conductive means includes a bus bar and wherein said bus bar engages said nozzle body.

6. A welding assembly according to claim 5 wherein said bus bar comprises a portion which engages said adapter.

7. A welding assembly according to claim 1 wherein said latch means comprise a first latch means which engages a first portion of said nozzle body and a second latch means which engages a second portion of said nozzle body.

8. A welding assembly according to claim 7 wherein said second latch means comprises a hook which engages a shaft contour in said nozzle body.

9. A welding assembly according to claim 1 wherein said wire guide comprises a trough portion for guiding said weld wire toward said work piece.

10. A welding assembly according to claim 9 wherein said wire guide comprises more than one trough for directing more than one weld wire toward a work piece.

11. A welding assembly according to claim 9 wherein a tip nut is provided to maintain said tip in engagement with said adapter.

12. A welding assembly according to claim 1 wherein said tip nut is provided with a dowel to control weld wire alignment.

13. A welding assembly comprising:
   a weld head having means associated therewith for directing at least one weld wire generally in the direction of a work piece to be welded;
   a nozzle body including a wire guide pivotally mounted about said weld head;
   said nozzle body having means in association therewith for pivoting said nozzle body about said weld head;

latch means removably mounting said wire guide upon said nozzle body;

said wire guide having means thereon for further directing said weld wire toward said work piece;

said nozzle body having means thereon adapted to engage electrical current carrying equipment;

said wire guide engaging a welding adapter made of electrically conductive material to further direct said weld wire toward the work piece;

a welding tip made of electrically conductive material mounted in operative relation with said adapter to further direct movement of the weld wire toward said work piece;

means for maintaining said weld tip in engagement with said welding assembly;

said adapter and said tip comprising a large mass of electrically conductive material;

whereby said large mass of electrically conductive material is able to conduct electric current more efficiently than without said large mass;

and whereby said nozzle body, wire guide, adapter, and welding tip may be simultaneously pivoted about said weld head to move said welding tip relative to said work piece, and whereby said wire guide can be readily removed from said welding assembly for cleaning and/or replacement thereof.

14. A welding assembly according to claim 13 wherein a tip nut made of highly electrically conductive material is provided in engagement with said welding tip and said adapter to provide a relatively large mass of electrically conductive material in the vicinity of said welding tip.

15. A welding assembly according to claim 13 wherein said means for pivoting said nozzle body about said weld head comprises an eccentric means.

16. A welding assembly according to claim 14 wherein said bus bar includes a portion which engages said nozzle body and said adapter.

17. A welding assembly according to claim 15 wherein said wire guide comprises a first latch means which engages a first portion of said nozzle body and a second latch means which engages a second portion of said nozzle body.

18. A welding assembly according to claim 15 wherein said eccentric means comprises an eccentric pin which engages said nozzle body.

19. A welding assembly according to claim 13 wherein said wire guide is curved to maintain electrical contact between the wire and the adapter and tip.

20. A welding assembly according to claim 13 wherein said wire guide is provided with a saddle contour which engages said adapter.

21. A welding assembly comprising:

a weld head having means associated therewith for directing at least one weld wire generally in the direction of a work piece to be welded;

a hinge plate affixed to said weld head;

a nozzle body including a wire guide pivotally mounted about said hinge plate;

said nozzle body having eccentric means in association therewith for pivoting said nozzle body about said hinge plate;

first and second latch means removably mounting said wire guide on said nozzle body;

said wire guide having means thereon for further directing said weld wire toward said work piece;

said nozzle body having means thereon adapted to engage electrical current carrying equipment;

said nozzle body having means for engaging a welding adapter, said welding adapter further directing said weld wire toward said work piece;

a welding tip engaging said adapter to further direct the weld wire toward said work piece;

and a tip nut maintaining said weld tip in engagement with said adapter;

said adapter, tip and nut being made of highly electrically conductive material and comprising a large mass of electrically conductive material to conduct electric current more efficiently than without said large mass, an whereby said nozzle body, wire guide, adapter, welding tip, and tip nut may be simultaneously pivoted about said hinge plate to move said welding tip relative to said work piece, and whereby said wire guide can be readily removed from said welding assembly for cleaning and/or replacement thereof.

22. A welding assembly according to claim 21 wherein said wire guide includes a saddle contour which engages said adapter.

23. A welding assembly according to claim 22 wherein said second latch means comprises a hook which engages a shaft contour in said nozzle body.

24. A welding assembly according to claim 23 wherein said nozzle body comprises a body portion and an adjacent portion for pivotally adjusting the position of said weld tip.

25. A welding assembly according to claim 24 wherein said wire guide further comprises an opening which aligns with an opening in said adjacent portion and a pin is removably inserted in said aligned openings to hold the weld guide in place.

26. A welding assembly according to claim 25 wherein said adjacent portion comprises extensions having openings therein which align with openings in said hinge to pivotally mount the nozzle body about the weld head.

27. A welding assembly according to claim 26 wherein a pivot pin extending into said hinge plate and nozzle body is provided to pivot the nozzle body about the weld head.

* * * * *

UNITED STATES PATENT AND TRADEMARK OFFICE
CERTIFICATE OF CORRECTION

PATENT NO. : 4,017,710
DATED : April 12, 1977
INVENTOR(S) : Elbert D. Watt

It is certified that error appears in the above-identified patent and that said Letters Patent are hereby corrected as shown below:

Column 1, line 45, after "mass." insert -- To obtain fine adjustment, the nozzle body, wire guide, welding tip, tip adapter and tip nut may be simultaneously pivoted about the weld head to move the welding tip relative to the work piece. --.

Column 2, line 38, "th" should read -- the --.

Column 4, line 56, "claim 1" should read -- claim 11 --.

Signed and Sealed this

Twenty-eighth Day of June 1977

[SEAL]

Attest:

RUTH C. MASON
Attesting Officer

C. MARSHALL DANN
Commissioner of Patents and Trademarks